US012298695B2

(12) United States Patent
Yamaki et al.

(10) Patent No.: US 12,298,695 B2
(45) Date of Patent: May 13, 2025

(54) IMAGE FORMING APPARATUS

(71) Applicant: FUJIFILM Business Innovation Corp., Tokyo (JP)

(72) Inventors: Hiromoto Yamaki, Kanagawa (JP); Daisuke Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 144 days.

(21) Appl. No.: 18/177,772

(22) Filed: Mar. 3, 2023

(65) Prior Publication Data

US 2023/0305470 A1 Sep. 28, 2023

(30) Foreign Application Priority Data

Mar. 25, 2022 (JP) ................................ 2022-050478

(51) Int. Cl.
*G03G 15/00* (2006.01)
*G03G 15/01* (2006.01)

(52) U.S. Cl.
CPC ..... *G03G 15/5062* (2013.01); *G03G 15/0194* (2013.01); *G03G 15/5016* (2013.01); *G03G 15/5037* (2013.01)

(58) Field of Classification Search
None
See application file for complete search history.

(56) References Cited

U.S. PATENT DOCUMENTS 5,991,555 A * 11/1999 Suzumi .............. G03G 15/2003 399/33

FOREIGN PATENT DOCUMENTS

JP 2006208416 8/2006

* cited by examiner

*Primary Examiner* — Sevan A Aydin
(74) *Attorney, Agent, or Firm* — JCIPRNET

(57) ABSTRACT

An image forming apparatus includes: a conveyance section that sequentially conveys a plurality of recording media; a transfer member that transfers an image formed on an image carrier to each of the recording media conveyed by the conveyance section, with a potential difference; a detection section that detects an electrical characteristic value of the transfer member in transferring the image to each of the recording media; and a determination section that determines multi feeding of the recording media, by comparing an electrical characteristic value in transferring the image to each of the recording media with an electrical characteristic value in transferring the image to each of the recording media.

6 Claims, 6 Drawing Sheets

FIG. 6

| NUMBER OF CONVEYED SHEET MEMBERS | TRANSFER VOLTAGE | RATE OF CHANGE IN SUBSEQUENT TRANSFER VOLTAGE RELATIVE TO PRECEDING TRANSFER VOLTAGE |
|---|---|---|
| FIRST SHEET MEMBER | -2.0[kV] | - |
| SECOND SHEET MEMBER | -2.1[kV] | 5.0[%] |
| THIRD SHEET MEMBER | -1.9[kV] | -9.5[%] |
| FOURTH SHEET MEMBER | -2.1[kV] | 10.5[%] |
| FIFTH SHEET MEMBER | -3.3[kV] | 57.1[%] |
| SIXTH SHEET MEMBER | -2.2[kV] | 4.8[%] |

IMAGE FORMING APPARATUS

CROSS-REFERENCE TO RELATED APPLICATIONS

This application is based on and claims priority under 35 USC 119 from Japanese Patent Application No. 2022-050478 filed Mar. 25, 2022.

BACKGROUND

(i) Technical Field

The present invention relates to an image forming apparatus.

(ii) Related Art

Japanese Unexamined Patent Publication No. 2006-208416 discloses an image forming apparatus including: a transfer belt that carries a toner image; a secondary transfer roller that nips a sheet between the secondary transfer roller and the transfer belt and transfers the toner image on the transfer belt to the sheet at a nip position; a current detection section that detects a current passing through the secondary transfer roller when a high-voltage power supply applies a transfer voltage to the secondary transfer roller in order to transfer the toner image on the transfer belt to the sheet; a calculation section that calculates an electrical resistance at the transfer, using a current value detected by the current detection section and the transfer voltage applied to the secondary transfer roller; and a comparison and determination section that compares the electrical resistance at the transfer calculated by the calculation unit with a preset threshold resistance and determines whether or not there is an abnormality in conveying the sheet at the nip position, based on a result of the comparison.

SUMMARY

Aspects of non-limiting embodiments of the present disclosure relates to an image forming apparatus that detects multi feeding of recording media to which an image is transferred, without a dedicated sensor for detecting multi feeding.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a conveyance section that sequentially conveys a plurality of recording media; a transfer member that transfers an image formed on an image carrier to each of the recording media conveyed by the conveyance section, with a potential difference; a detection section that detects an electrical characteristic value of the transfer member in transferring the image to each of the recording media; and a determination section that determines multi feeding of the recording media, by comparing an electrical characteristic value in transferring the image to a preceding one of the recording media with an electrical characteristic value in transferring the image to a subsequent one of the recording media.

BRIEF DESCRIPTION OF THE DRAWINGS

FIG. 6 is a table showing a transfer voltage in transferring a toner image to a sheet member in the image forming apparatus according to the exemplary embodiment of the present disclosure.

DETAILED DESCRIPTION

Figure 1:
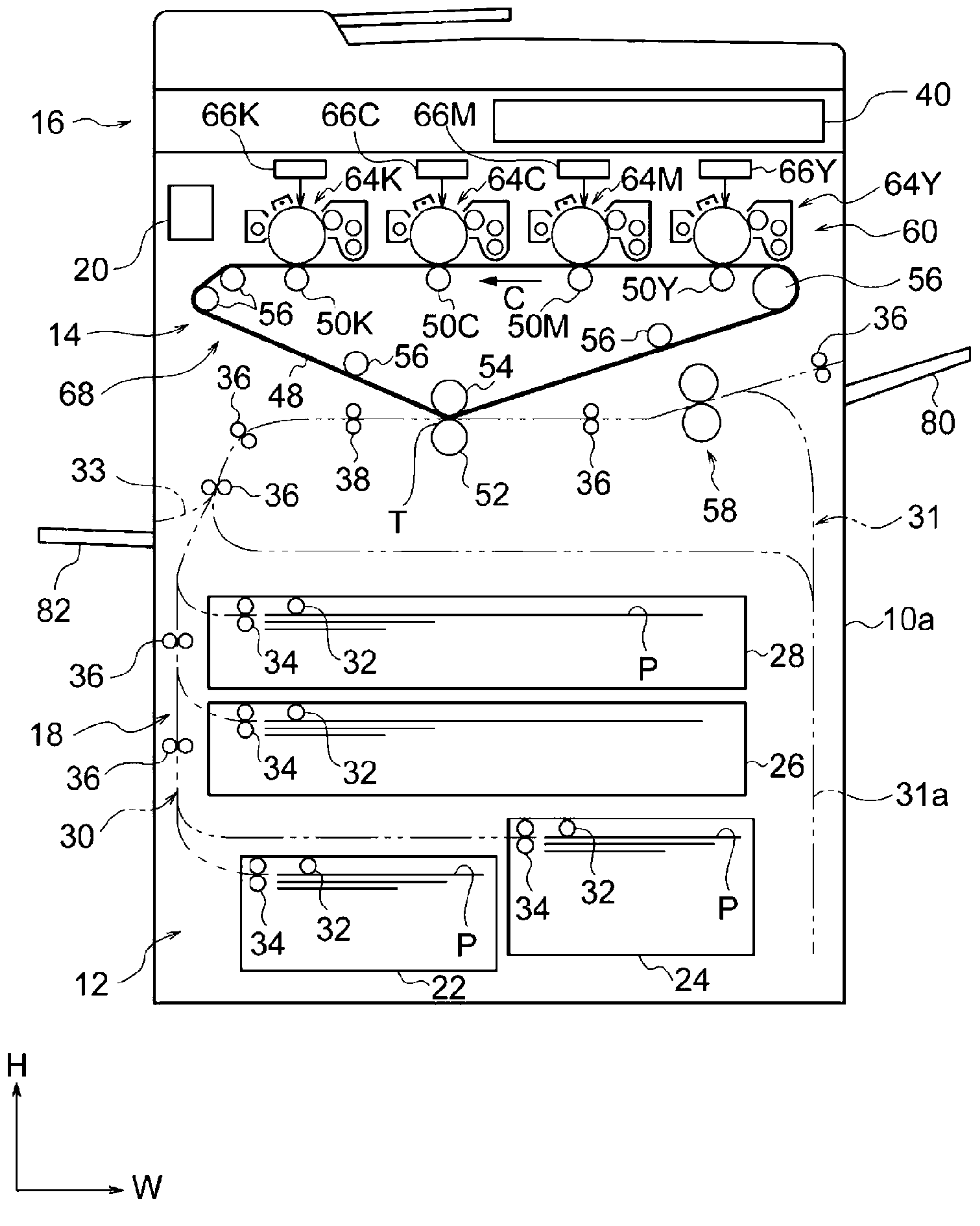
FIG. 1 is a schematic configuration diagram illustrating an image forming apparatus according to an exemplary embodiment of the present disclosure.

With reference to FIGS. 1 to 6, a description will be given of an example of an image forming apparatus according to an exemplary embodiment of the present disclosure. In the drawings, an arrow H is directed vertically and indicates an apparatus height direction, and an arrow W is directed horizontally and indicates an apparatus width direction.

(Overall Configuration of Image Forming Apparatus 10)

As illustrated in FIG. 1, an image forming apparatus 10 includes a sheet accommodation section 12, a main operation section 14, a document reading section 16, and a display section 40 that are disposed in this order from a lower side to an upper side in the apparatus height direction. The image forming apparatus 10 also includes a conveyance section 18 that conveys sheet members P each of which is an example of a recording medium, and a management section 20 that manages the operation of each section.

The sheet accommodation section 12 accommodates the sheet members P. The main operation section 14 forms an image on each sheet member P conveyed from the sheet accommodation section 12. The document reading section 16 reads an image of a document. The display section 40 displays a screen on which a user exchanges information with the image forming apparatus 10 and information about image formation.

[Sheet Accommodation Section 12]

As illustrated in FIG. 1, the sheet accommodation section 12 includes a first accommodation section 22, a second accommodation section 24, a third accommodation section 26, and a fourth accommodation section 28 that are capable of accommodating the sheet members P of different sizes. Each of the first accommodation section 22, the second accommodation section 24, the third accommodation section 26, and the fourth accommodation section 28 includes a feed roller 32 that feeds the accommodated sheet members P one by one, and a multi feeding prevention roller 34 that conveys the fed sheet members P to a conveyance path 30 in the image forming apparatus 10 one by one.

[Conveyance Section 18]

As illustrated in FIG. 1, the conveyance section 18 includes a plurality of conveyance rollers 36 that receive the sheet members P from each multi feeding prevention roller 34 and conveys the sheet members P one by one along the conveyance path 30. The conveyance section 18 also includes a registration roller 38 that is disposed upstream of a transfer position T (to be described below) in a conveyance direction of the sheet members P (hereinafter, simply referred to as "a sheet conveyance direction"). The registration roller 38 temporarily stops the sheet members P, and feeds the sheet members P to a secondary transfer position at a predetermined timing.

An upstream portion of the conveyance path 30 in the sheet conveyance direction extends upward from below at one side in the apparatus width direction. A downstream portion of the conveyance path 30 in the sheet conveyance direction extends from one side to the other side in the apparatus width direction, and reaches a discharge section 80 through which the sheet members P are discharged externally from an apparatus main body 10*a*.

A duplex conveyance path 31 is connected to a downstream end of the conveyance path 30 in the sheet conveyance direction. On the duplex conveyance path 31, each sheet member P is conveyed and reversed such that an image is formed on the reverse side of the sheet member P.

The duplex conveyance path 31 includes a switchback path 31*a*. Each sheet member P fed from the switchback path 31*a* is reversed upside down and is fed to an upper end of the upstream portion of the conveyance path 30 in the sheet conveyance direction.

A manual feed path 33 is connected to the upper end of the upstream portion of the conveyance path 30 in the sheet conveyance direction. A sheet member P supplied from a manual feed section 82 disposed outside the apparatus main body 10*a* is conveyed on the manual feed path 33.

[Main Operation Section 14]

As illustrated in FIG. 1, the main operation section 14 includes an image forming section 60 that forms a toner image, a transfer unit 68 that transfers the toner image to each sheet member P, and a fixing device 58 that fixes the toner image formed on the sheet member P, to the sheet member P.

—Image Forming Section 60—

The image forming section 60 includes image forming units 64K, 64C, 64M, and 64Y that respectively form toner images of black (K), cyan (C), magenta (M), and yellow (Y). In the following description, in a case where the image forming units 64K, 64C, 64M, 64Y are not particularly distinguished from one another, YMCK at the end of the reference numerals may be omitted.

Figure 2:
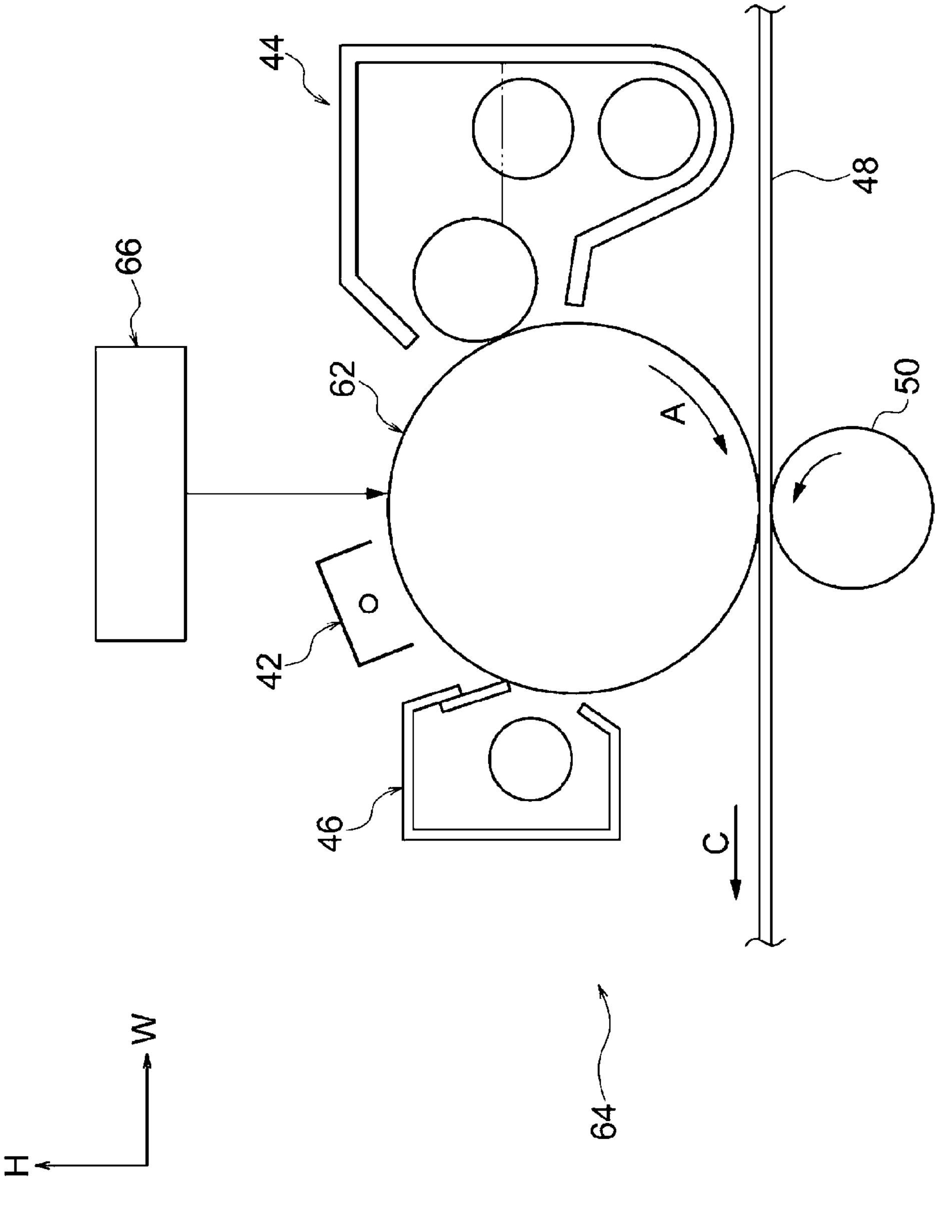
FIG. 2 is a configuration diagram illustrating an image unit of the image forming apparatus according to the exemplary embodiment of the present disclosure.

As illustrated in FIG. 2, each of the image forming units 64 includes a photoconductor drum 62 that has a cylindrical shape and rotates in a direction indicated by an arrow A in FIG. 2, a charger 42 that charges the photoconductor drum 62, a developer 44 that develops an electrostatic latent image (to be described later) to visualize the electrostatic latent image as a toner image, and a cleaning member 46.

The image forming section 60 also includes exposure devices 66K, 66C, 66M, and 66Y (see FIG. 1) that respectively irradiate the photoconductor drums 62 charged by the chargers 42, with exposure light to form electrostatic latent images.

In this configuration, the chargers 42 charge the rotating photoconductor drums 62, and the exposure devices 66 irradiate the charged photoconductor drums 62 with the exposure light to form the electrostatic latent images. The developers 44 then develop the electrostatic latent images to visualize the electrostatic latent images as toner images.

—Transfer Unit 68—

As illustrated in FIG. 1, the transfer unit 68 includes an endless transfer belt 48, a primary transfer roller 50 that transfers a toner image from each photoconductor drum 62 (see FIG. 2) to the transfer belt 48, and a secondary transfer roller 52 that transfers the toner image on the transfer belt 48 to each sheet member P. The transfer unit 68 also includes an auxiliary roller 54 that is disposed opposite the secondary transfer roller 52 across the transfer belt 48, and a plurality of rollers 56 around which the transfer belt 48 is wound. The transfer belt 48 is an example of an image carrier.

The transfer belt 48 has a triangular shape with its vertex pointing downward as seen in an apparatus depth direction, and a base of the triangular transfer belt 48 is sandwiched between the photoconductor drum 62 and the primary transfer roller 50. The vertex of the triangular transfer belt 48 is sandwiched between the secondary transfer roller 52 and the auxiliary roller 54.

One of the plurality of rollers 56 functions as a drive roller that revolves the transfer belt 48 in a direction indicated by an arrow C in the drawings.

The secondary transfer roller 52, the auxiliary roller 54, and the like will be described in detail below.

(Operation of Image Forming Apparatus)

The image forming apparatus 10 forms an image as follows.

First, the chargers 42 (see FIG. 2) for the respective colors uniformly negatively charge surfaces of the rotating photoconductor drums 62 for the respective colors at a predetermined potential. Next, based on image data read by the document reading section 16 (see FIG. 1), the exposure devices 66 (see FIG. 1) for the respective colors irradiate the charged surfaces of the photoconductor drums 62 for the respective colors with exposure light to form electrostatic latent images.

Thus, the electrostatic latent images corresponding to the image data are formed on the surfaces of the photoconductor drums 62 for the respective colors. Further, the developers 44 for the respective colors develop the electrostatic latent images to visualize the electrostatic latent images as toner images. The toner images formed on the surfaces of the photoconductor drums 62 for the respective colors are sequentially transferred to the transfer belt 48 by the primary transfer rollers 50.

Each sheet member P fed from one of the first accommodation section 22, the second accommodation section 24, the third accommodation section 26, and the fourth accommodation section 28 (see FIG. 1) to the conveyance path 30 by the corresponding feed roller 32 is fed to the transfer position T where the transfer belt 48 and the secondary transfer roller 52 are in contact with each other. When the sheet member P is conveyed between the transfer belt 48 and the secondary transfer roller 52 at the transfer position T, the toner image on the transfer belt 48 is transferred to the sheet member P. Specifically, the toner image on the transfer belt 48 is transferred to the sheet member P with a potential difference caused between the auxiliary roller 54 and the secondary transfer roller 52.

The fixing device 58 fixes the toner image transferred to the sheet member P, to the sheet member P. The sheet member P to which the toner image has been fixed is discharged externally from the apparatus main body 10*a* toward the discharge section 80.

(Main Configuration)

Next, a description will be given of the secondary transfer roller 52, the auxiliary roller 54, and the like.

Figure 3:
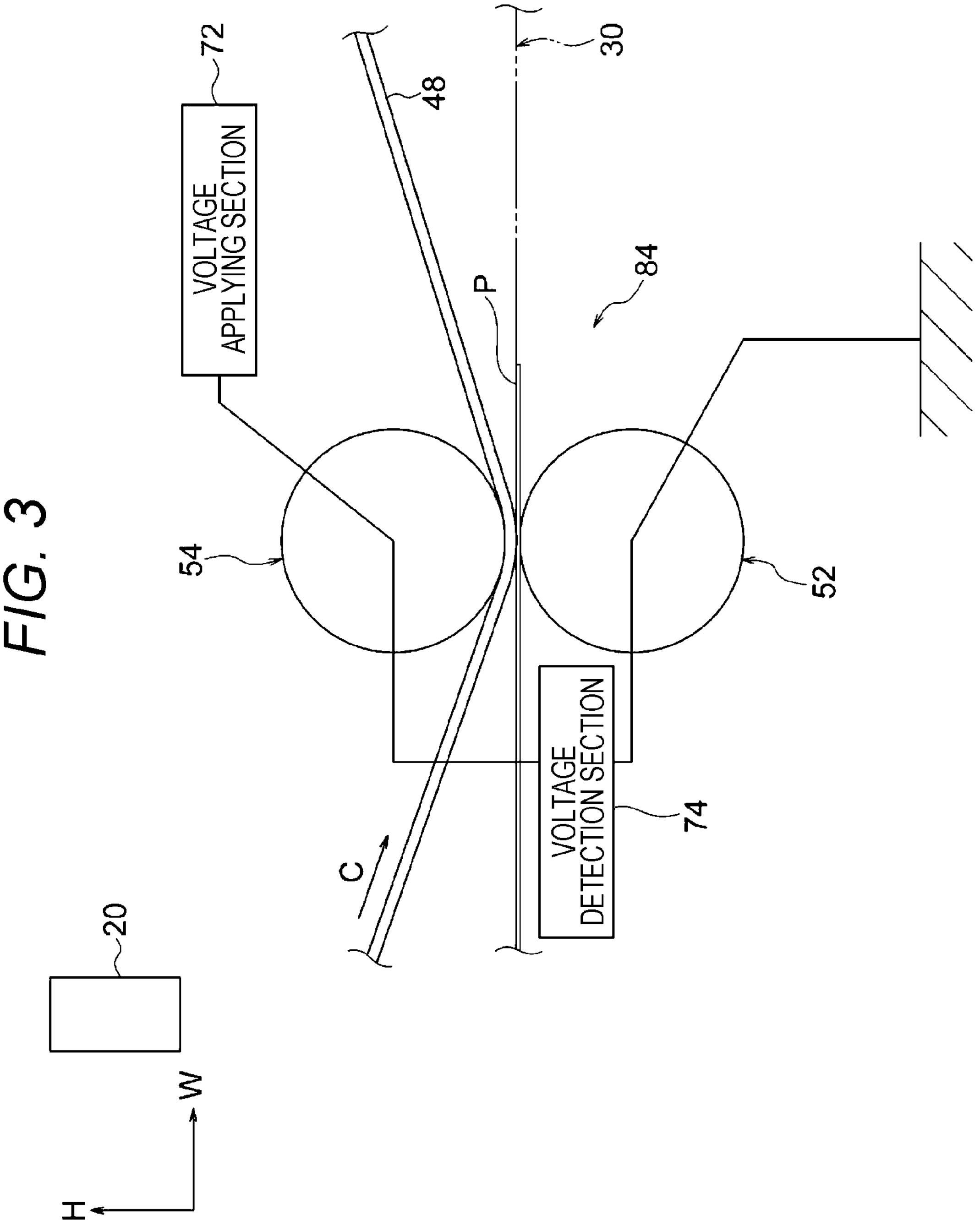
FIG. 3 is a configuration diagram illustrating a secondary transfer roller and the like of the image forming apparatus according to the exemplary embodiment of the present disclosure.

The secondary transfer roller 52 is grounded as illustrated in FIG. 3. The image forming apparatus 10 also includes a voltage applying section 72 that applies a secondary transfer voltage to the auxiliary roller 54. The secondary transfer roller 52, the auxiliary roller 54, and the voltage applying section 72 constitute a transfer member 84 that transfers a toner image on the transfer belt 48 to each sheet member P.

The image forming apparatus 10 also includes a voltage detection section 74 that detects a secondary transfer voltage (hereinafter, also referred to as "a transfer voltage") applied between the auxiliary roller 54 and the secondary transfer roller 52. The transfer voltage detected by the voltage detection section 74 is managed by the management section 20. The voltage detection section 74 is an example of a detection section. The transfer voltage is an example of an electrical characteristic value.

In this configuration, when the voltage applying section 72 applies the secondary transfer voltage to the auxiliary roller 54, a potential difference is caused at the transfer position T between the auxiliary roller 54 and the secondary transfer roller 52. When each sheet member P is conveyed while being nipped between the transfer belt 48 and the secondary transfer roller 52, the toner image on the transfer belt 48 is transferred to the sheet member P with the potential difference caused at the transfer position T. In the present exemplary embodiment, for example, the transfer member 84 is subjected to constant current control.

Next, a description will be mainly given of a configuration of a portion of the management section 20 that manages the transfer voltage detected by the voltage detection section 74.

[Hardware Configuration of Management Section 20]

Figure 4B:
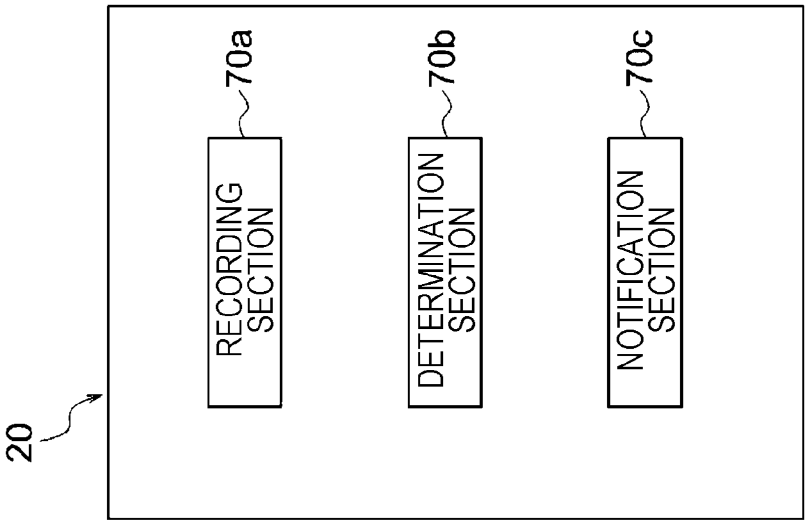
FIGS. 4A and 4B are block diagrams each illustrating a management section of the image forming apparatus according to the exemplary embodiment of the present disclosure.
Figure 4A:
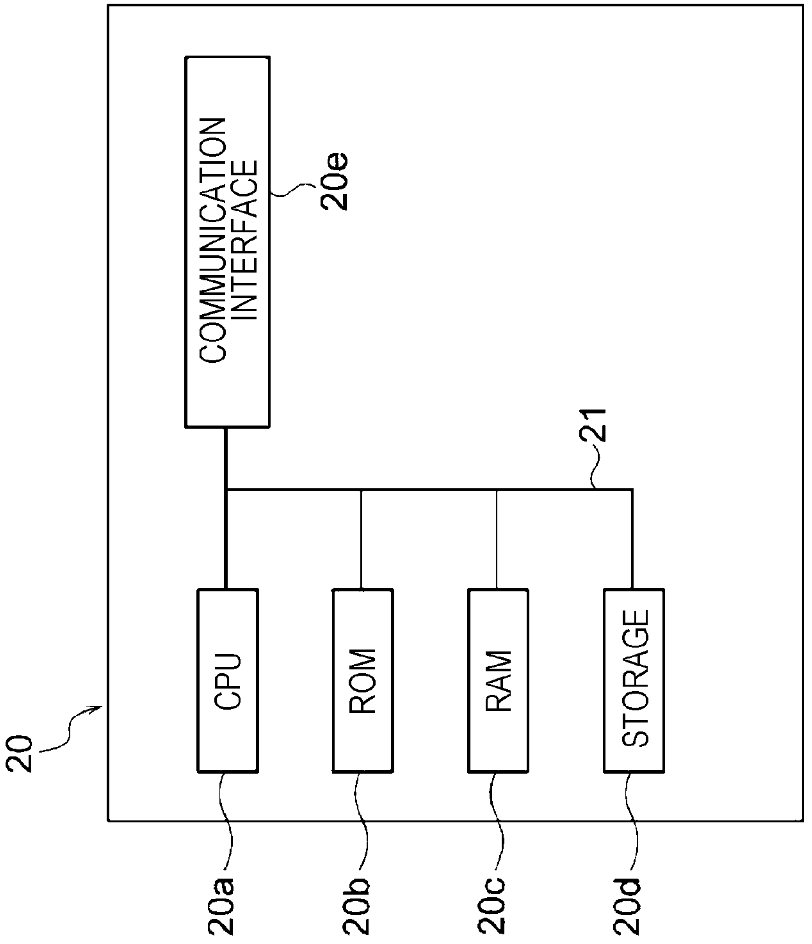

As illustrated in FIG. 4A, the management section 20 includes a central processing unit (CPU) 20*a*, a read only memory (ROM) 20*b*, a random access memory (RAM) 20*c*, a storage 20*d*, and a communication interface (I/F) 20*e*. These components are communicably connected to each other via a bus 21.

The CPU 20*a* is an abbreviation of a central processing unit that executes various programs and controls the respective sections. Specifically, the CPU 20*a* reads programs from the ROM 20*b* or the storage 20*d* and executes each program with the RAM 20*c* serving as a work area. The CPU 20*a* controls the respective sections and performs various kinds of arithmetic processing in accordance with the programs recorded in the ROM 20*b* or the storage 20*d*.

In the present exemplary embodiment, the ROM 20*b* or the storage 20*d* stores a calculation program for calculating a rate of change in each of the transfer voltages sequentially detected by the voltage detection section 74.

The ROM 20*b* stores various programs and various kinds of data. The RAM 20*c* serves as a work area and temporarily stores a program or data. The storage 20*d* includes a hard disk drive (HDD) or a solid state drive (SSD) and stores various programs including an operating system and various kinds of data. The communication interface 20*e* is an interface that allows the management section 20 to communicate with each section.

In executing the management program described above, the management section 20 implements various functions using the hardware resources described above. A description will be given of a functional configuration to be implemented by the management section 20.

[Functional Configuration of Management Section 20]

As illustrated in FIG. 4B, the management section 20 includes a recording section 70*a* that acquires and records a transfer voltage, and a determination section 70*b* that compares a rate of change between a preceding transfer voltage and a subsequent transfer voltage each recorded in the recording section 70*a* and determines whether the rate of change is equal to or more than a predetermined threshold value. The management section 20 also includes a notification section 70*c* that makes a notification about information determined by the determination section 70*b*. Each functional configuration is implemented in such a way that the CPU 20*a* reads and executes a management program stored in the ROM 20*b* or the storage 20*d*.

(Operation of Main Configuration)

Figure 5:
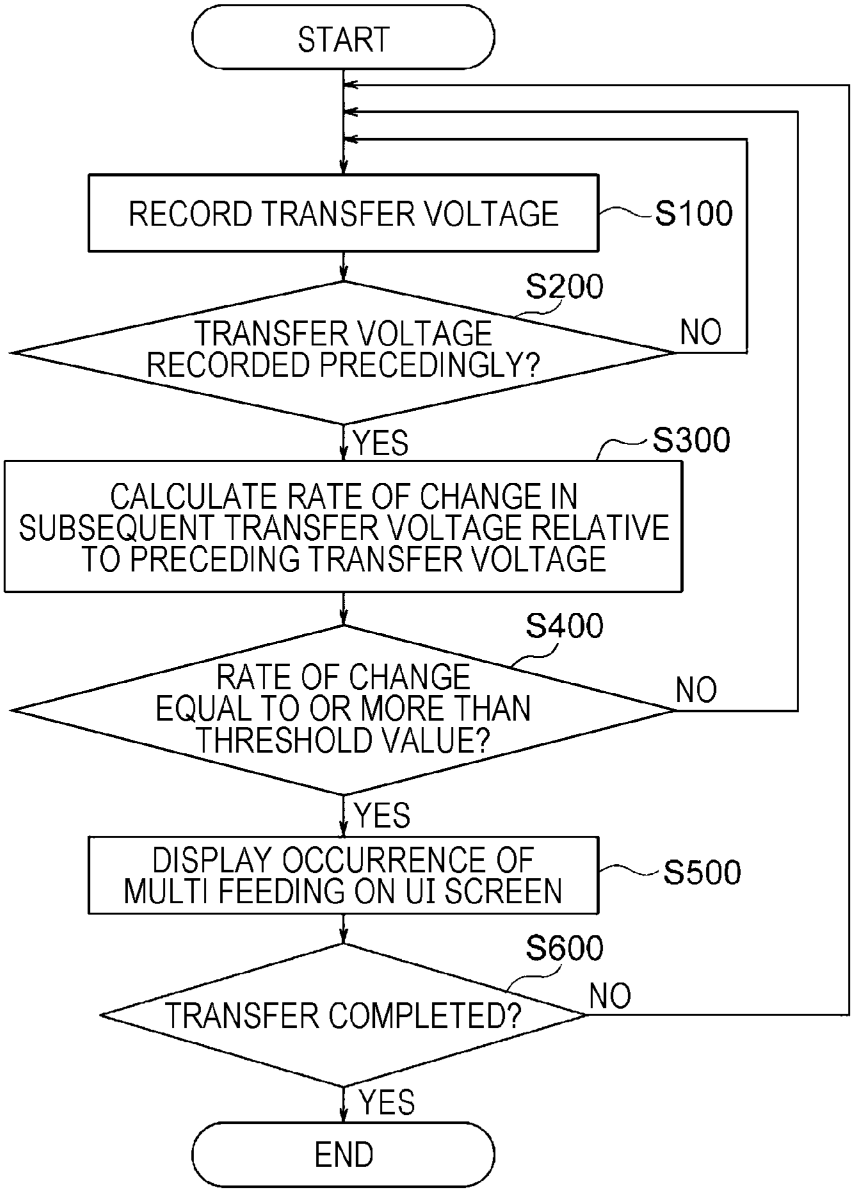
FIG. 5 is a flowchart illustrating processing to be carried out by the image forming apparatus according to the exemplary embodiment of the present disclosure in detecting multi feeding.

With reference to a flowchart of FIG. 5, next, a description will be given of operation of a main configuration. With reference to the flowchart of FIG. 5, specifically, a description will be given of processing of detecting multi feeding that refers to a state in which the sheet members P are conveyed in an overlapping manner.

When a user operates the image forming apparatus 10 to execute a print job for forming a toner image on each of the sheet members P, the processing proceeds to step S100. It should be noted that the print job to be executed is single-sided printing and an image is formed only on a front side of each sheet member P.

In step S100, the voltage detection section 74 detects a transfer voltage for transferring the toner image to each sheet member P at the transfer position T, and the recording section 70*a* acquires and records the transfer voltage detected by the voltage detection section 74. After the recording section 70*a* records the transfer voltage, the processing proceeds to step S200.

In step S200, the determination section 70*b* determines whether there is a transfer voltage (hereinafter, referred to as "a preceding transfer voltage") recorded immediately prior to the recorded transfer voltage (hereinafter, referred to as "a subsequent transfer voltage"). Here, the term "preceding transfer voltage" refers to a transfer voltage for transferring the toner image to one sheet preceding to the sheet members P.

When the preceding transfer voltage is recorded, the processing proceeds to step S300. On the other hand, when the preceding transfer voltage is not recorded, the processing returns to step S100 in which the recording section 70*a* records a transfer voltage again.

In step S300, the determination section 70*b* calculates a rate of change in the subsequent transfer voltage relative to the preceding transfer voltage. The processing then proceeds to step S400.

In step S400, the determination section 70*b* determines whether the rate of change calculated in step S300 is equal to or more than a predetermined threshold value set for determining multi feeding.

FIG. 6 illustrates an exemplary table showing the number of conveyed sheet members P, a transfer voltage, and a rate of change in a subsequent transfer voltage relative to a preceding transfer voltage. The exemplary table of FIG. 6 shows a case where six sheet members P equal in paper type to one another are conveyed from a single accommodation section under constant current control. The predetermined threshold value for the rate of change is +40%.

In the exemplary table, the rate of change in the transfer voltage for transferring the toner image to the fifth sheet member P is +57.1% with respect to the preceding transfer voltage and is equal to or more than the threshold value.

As described above, when the rate of change in the transfer voltage is equal to or more than the threshold value, the determination section 70*b* determines that multi feeding has occurred. The processing then proceeds to step S500. On the other hand, when the rate of change in the transfer voltage is less than the threshold value, the processing returns to step S100 in which the recording section 70*a* records a transfer voltage again.

In the present exemplary embodiment, it is determined that the multi feeding has occurred at the fifth sheet member P in determining whether multi feeding has occurred at the sixth sheet member P shown in the table of FIG. 6. Therefore, a rate of change in the transfer voltage for transferring the toner image to the sixth sheet member P is calculated from a comparison with the transfer voltage for transferring the toner image to the fourth sheet member P. In other words, the determination section 70*b* determines multi feeding, using a rate of change between a transfer voltage detected prior to a transfer voltage determined that multi feeding has occurred and a transfer voltage detected subsequent to the transfer voltage determined that the multi feeding has occurred.

In step S500, the notification section 70*c* causes the display section 40 to display the occurrence of the multi feeding. The processing then proceeds to step S600.

In step S600, the determination section 70*b* determines whether the transfer of the toner image executed by the print job is completed. When the transfer of the toner image to all the sheet members P is completed, the processing ends. On the other hand, when the transfer of the toner image to all the sheet members P is not completed yet, the processing returns to step S100 in which the recording section 70*a* records a transfer voltage again.

Summary

As described above, the image forming apparatus 10 determine multi feeding of the sheet members P, by comparing a preceding transfer voltage with a subsequent transfer voltage. Therefore, multi feeding of the sheet members P to which a toner image is transferred is detected without a dedicated sensor for detecting multi feeding.

In the image forming apparatus 10, the determination section 70*b* determines that multi feeding has occurred, when a rate of change in each of transfer voltages sequentially detected by the voltage detection section 74 is equal to or more than a threshold value. This configuration therefore inhibits decrease in accuracy of multi feeding detection in a case where the sheet members P are different in paper type from one another, as compared with a configuration that determines that multi feeding has occurred, when a difference between absolute values of the transfer voltages detected sequentially is equal to or more than the threshold value.

Also in the image forming apparatus 10, when it is determined that the multi feeding has occurred, the determination section 70*b* determines the multi feeding, using a rate of change between a transfer voltage detected prior to a transfer voltage determined that the multi feeding has occurred and a transfer voltage detected subsequent to the transfer voltage determined that the multi feeding has occurred. This configuration therefore inhibits occurrence of an erroneous determination as compared with a configuration that determines multi feeding, using a rate of change between a transfer voltage determined that multi feeding has occurred and a transfer voltage detected subsequent to the transfer voltage determined that the multi feeding has occurred.

Also in the image forming apparatus 10, when it is determined that the multi feeding has occurred, the display section 40 displays the occurrence of the multi feeding. This configuration therefore notifies the user of the multi feeding.

Also in the image forming apparatus 10, when it is determined that the multi feeding has occurred, the display section 40 displays the occurrence of the multi feeding. This configuration therefore notifies the user of the multi feeding in a visible manner.

The present disclosure has been described in detail using a specific exemplary embodiment; however, the present disclosure is not limited to this exemplary embodiment. It is apparent to a person skilled in the art that the present disclosure can take various other embodiments within the scope of the present disclosure. For example, in the foregoing exemplary embodiment, a transfer voltage is used as an electrical characteristic value for detecting multi feeding. The electrical characteristic value is not necessarily the transfer voltage, but may be a transfer current in a case of constant voltage control. The electrical characteristic value may alternatively be, for example, a resistance value of each sheet member P nipped between the transfer belt 48 and the secondary transfer roller 52.

Also in the foregoing exemplary embodiment, multi feeding is determined using a rate of change in a subsequent transfer voltage relative to a preceding transfer voltage. For example, multi feeding may be determined using a difference between an absolute value of the preceding transfer voltage and an absolute value of the subsequent transfer voltage. Furthermore, in a case where a toner image is transferred to a plurality of sheet members P in advance, multi feeding may be determined using a rate of change in a subsequent transfer voltage relative to an average value of the transfer voltages.

Although not particularly described in the foregoing exemplary embodiment, in a case of double-sided printing, multi feeding is determined using a rate of change between a transfer voltage in transferring a toner image to a front side of a preceding sheet member P and a transfer voltage in transferring the toner image to a front side of a subsequent sheet member P.

Although not particularly described in the foregoing exemplary embodiment, in a case where an absolute value of a subsequent transfer voltage is smaller than an absolute value of a preceding transfer voltage at a negative rate of change and this negative rate of change is equal to or more than a predetermined threshold value, an error such as erroneous insertion of a sheet member of a wrong paper type may be detected.

Although not particularly described in the foregoing exemplary embodiment, in a case where toner images of different colors are sequentially transferred to a single sheet member P while being overlaid on another, multi feeding of the sheet members P is determined using a transfer voltage in transferring one of the toner images to each sheet member P first.

Although not particularly described in the foregoing exemplary embodiment, in a case where multi feeding is determined, the conveyance of the sheet members P may be stopped.

In the foregoing exemplary embodiment, the user is notified of multi feeding in a visible manner. Alternatively, the user may be notified of multi feeding in, for example, an olfactory manner or an audible manner.

preferred embodiments of the present disclosure have been described in detail above with reference to the accompanying drawings; however, the present disclosure is not limited to this embodiment. It is obvious that a person having ordinary knowledge in the technical field to which the present disclosure is pertinent can conceive various modifications or variations within the scope of the technical idea described in the claims, and it is understood that such modifications or variations also belong to the technical scope of the present disclosure.

What is claimed is:

1. An image forming apparatus comprising:

a conveyance section that sequentially conveys a plurality of recording media;

a transfer member that transfers an image formed on an image carrier to each of the recording media conveyed by the conveyance section, with a potential difference;

a detection section that detects an electrical characteristic value of the transfer member in transferring the image to each of the recording media; and a determination section that determines multi feeding of the recording media, by comparing an electrical characteristic value in transferring the image to a preceding one of the recording media with an electrical characteristic value in transferring the image to a subsequent one of the recording media, wherein the determination section determines that the multi feeding has occurred, when a rate of change detected by the detection section between the electrical characteristic value in the preceding one of the recording media and the electrical characteristic value in the subsequent one of the recording media is equal to or more than a threshold value.

2. The image forming apparatus according to claim 1, wherein the determination section determines the multi feeding, using a rate of change between an electrical characteristic value detected prior to an electrical characteristic value used to determine that the multi feeding has occurred and an electrical characteristic value detected subsequent to the electrical characteristic value used to determine that the multi feeding has occurred.

3. The image forming apparatus according to claim 1, further comprising a notification section that notifies a user of the multi feeding when the determination section determines that the multi feeding has occurred.

4. The image forming apparatus according to claim 3, further comprising a display section that displays information about image formation, wherein the notification section causes the display section to display the multi feeding.

5. The image forming apparatus according to claim 3, wherein the detection section comprises a sensor, wherein a processor is configured to function as the determination section and the notification section.

6. The image forming apparatus according to claim 1, wherein the detection section comprises a sensor, wherein a processor is configured to function as the determination section.

* * * * *